(12) United States Patent
Abe

(10) Patent No.: US 6,778,330 B2
(45) Date of Patent: Aug. 17, 2004

(54) FOCUSING APPARATUS OF A TELESCOPIC LENS SYSTEM

(75) Inventor: Tetsuya Abe, Hokkaido (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/255,590

(22) Filed: Sep. 27, 2002

(65) Prior Publication Data
US 2003/0072091 A1 Apr. 17, 2003

(30) Foreign Application Priority Data
Sep. 28, 2001 (JP) ........................................ 2001-301873

(51) Int. Cl.[7] .............................................. G02B 15/14
(52) U.S. Cl. ........................ 359/685; 359/399; 359/695; 359/823
(58) Field of Search ................................ 359/694, 823, 359/685, 399, 695

(56) References Cited

U.S. PATENT DOCUMENTS

| | | | |
|---|---|---|---|
| 4,067,027 A | 1/1978 | Yamazaki | 396/432 |
| 4,262,988 A | 4/1981 | Ishibai et al. | 359/418 |
| 4,400,065 A | 8/1983 | Nagler | 359/788 |
| 5,071,238 A * | 12/1991 | Richard | 359/708 |
| 5,325,234 A * | 6/1994 | Yoneyama | 359/684 |
| 5,583,692 A | 12/1996 | Funatsu | 359/422 |
| 5,729,390 A | 3/1998 | Abe | 359/661 |
| 5,926,657 A | 7/1999 | Hasushita | 396/148 |
| 6,088,053 A | 7/2000 | Hammack et al. | 348/61 |
| 6,439,727 B1 * | 8/2002 | Kodie | 359/399 |
| 2001/0028498 A1 | 10/2001 | Haga et al. | 359/407 |
| 2002/0040959 A1 * | 4/2002 | Kaneko et al. | 250/201.2 |

FOREIGN PATENT DOCUMENTS

| | | |
|---|---|---|
| JP | 57-79909 | 5/1982 |
| JP | 62-96919 | 5/1987 |
| JP | 5-2132 | 1/1993 |
| JP | 6-2330 | 1/1994 |
| JP | 7-8848 | 2/1995 |
| JP | 7-283978 | 10/1995 |
| JP | 2624556 | 4/1997 |
| JP | 11248996 | 9/1999 |
| JP | 2001-281555 | 10/2001 |
| JP | 2001-311868 | 11/2001 |
| WO | 01/52531 | 7/2001 |

OTHER PUBLICATIONS

English Language Abstract of JP 11–248996.
English Language Abstract of JP 2001–311868.

* cited by examiner

Primary Examiner—Georgia Epps
Assistant Examiner—M. Hasan
(74) Attorney, Agent, or Firm—Greenblum & Bernstein, P.L.C.

(57) ABSTRACT

A focusing apparatus applied to a telescopic lens system includes more than two lens groups. The focusing apparatus includes two focusing mechanisms which are operable independently from each other, and are adapted to vary both absolute and relative positions of two lens groups in the optical axis direction.

26 Claims, 11 Drawing Sheets

FNo.= 4.0 d Line
g Line
C Line

-0.1  0.1
SPHERICAL
ABERRATION

CHROMATIC
ABERRATION

W=4.6

-0.01  0.01
LATERAL
CHROMATIC
ABERRATION

W=4.6

— S
-- M

-0.05  0.05
ASTIGMATISM

W=4.6

-1  (%)  1
DISTORTION

H= 4.65 d Line
g Line
C Line

-0.1  0.1
SPHERICAL
ABERRATION

CHROMATIC
ABERRATION

Y= 2.98

-0.01  0.01
LATERAL
CHROMATIC
ABERRATION

Y= 2.98

— S
-- M

-0.05  0.05
ASTIGMATISM

Y= 2.98

-1  (%)  1
DISTORTION

H= 4.65

- 0.1    0.1
SPHERICAL
ABERRATION

CHROMATIC
ABERRATION

— d Line
······ g Line
---- C Line

Y= 2.98

- 0.01    0.01
LATERAL
CHROMATIC
ABERRATION

Y= 2.98

- 0.05    0.05
ASTIGMATISM

— S
-- M

Y= 2.98

-1  (%)  1
DISTORTION

H= 4.65

- 0.1    0.1
SPHERICAL
ABERRATION

CHROMATIC
ABERRATION

— d Line
······ g Line
---- C Line

Y= 2.98

- 0.01    0.01
LATERAL
CHROMATIC
ABERRATION

Y= 2.98

- 0.05    0.05
ASTIGMATISM

— S
-- M

Y= 2.98

-1  (%)  1
DISTORTION

FNo.= 4.0

—— d Line
------ g Line
---- C Line

-0.1  0.1
SPHERICAL
ABERRATION

CHROMATIC
ABERRATION

W=4.6

-0.01  0.01
LATERAL
CHROMATIC
ABERRATION

W=4.6

—— S
-- M

-0.05  0.05
ASTIGMATISM

W=4.6

-1  (%)  1
DISTORTION

H= 4.65

—— d Line
------ g Line
---- C Line

-0.1  0.1
SPHERICAL
ABERRATION

CHROMATIC
ABERRATION

Y= 2.98

-0.01  0.01
LATERAL
CHROMATIC
ABERRATION

Y= 2.98

—— S
-- M

-0.05  0.05
ASTIGMATISM

Y= 2.98

-1  (%)  1
DISTORTION

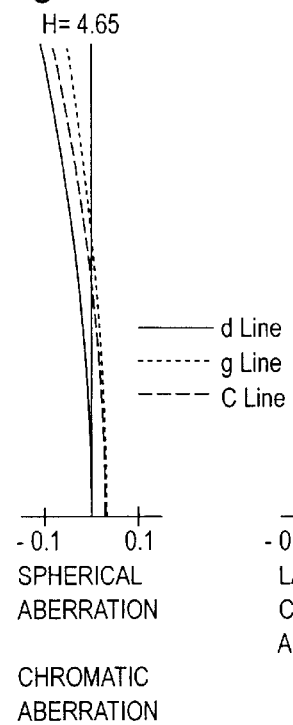
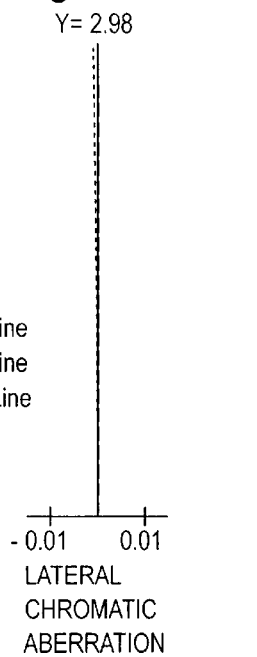
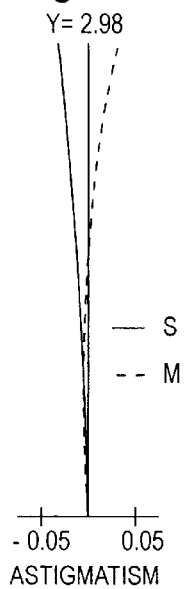
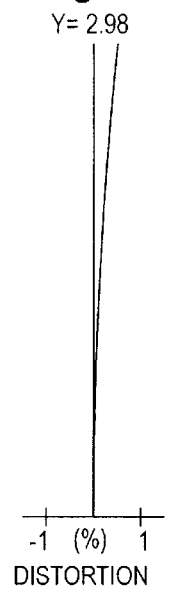
Fig. 11A  H= 4.65
SPHERICAL ABERRATION
CHROMATIC ABERRATION
— d Line
······ g Line
– – – C Line
-0.1   0.1
Fig. 11B  Y= 2.98
LATERAL CHROMATIC ABERRATION
-0.01   0.01
Fig. 11C  Y= 2.98
ASTIGMATISM
— S
– – M
-0.05   0.05
Fig. 11D  Y= 2.98
DISTORTION
-1  (%)  1
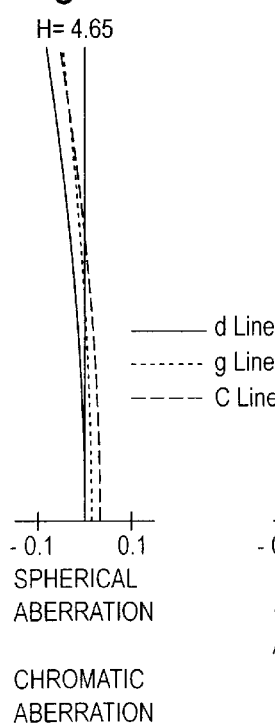
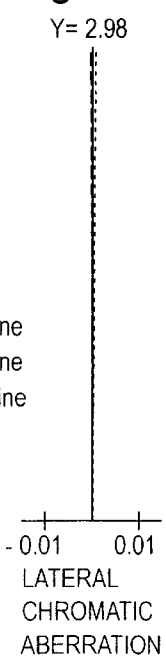
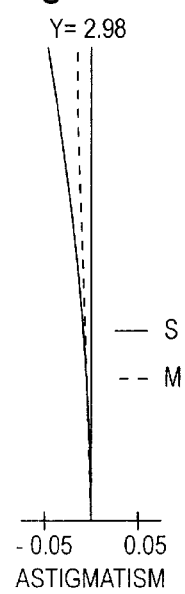
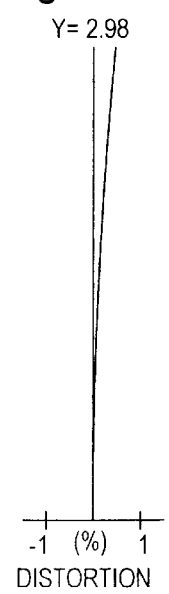
Fig. 12A  H= 4.65
SPHERICAL ABERRATION
CHROMATIC ABERRATION
— d Line
······ g Line
– – – C Line
-0.1   0.1
Fig. 12B  Y= 2.98
LATERAL CHROMATIC ABERRATION
-0.01   0.01
Fig. 12C  Y= 2.98
ASTIGMATISM
— S
– – M
-0.05   0.05
Fig. 12D  Y= 2.98
DISTORTION
-1  (%)  1

Fig. 13A
FNo.= 4.0

— d Line
······ g Line
---- C Line

-0.1   0.1
SPHERICAL
ABERRATION

CHROMATIC
ABERRATION

Fig. 13B
W=4.6

-0.01   0.01
LATERAL
CHROMATIC
ABERRATION

-0.05   0.05
ASTIGMATISM

Fig. 13D
W=4.6

-1  (%)  1
DISTORTION

Fig. 14A
H= 4.65

— d Line
······ g Line
---- C Line

-0.1   0.1
SPHERICAL
ABERRATION

CHROMATIC
ABERRATION

Fig. 14B
Y= 2.98

-0.01   0.01
LATERAL
CHROMATIC
ABERRATION

-0.05   0.05
ASTIGMATISM

Fig. 14D
Y= 2.98

-1  (%)  1
DISTORTION

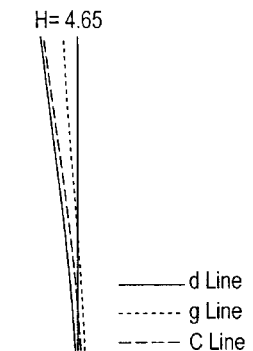
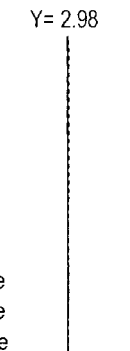
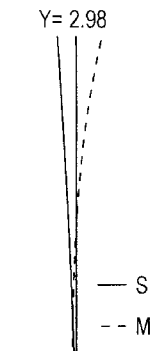
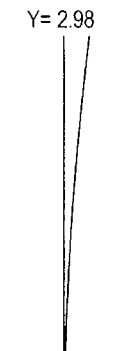
Fig. 15A  Fig. 15B  Fig. 15C  Fig. 15D
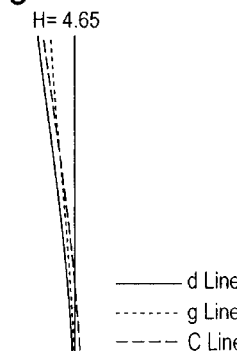
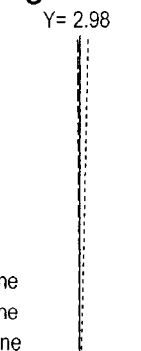
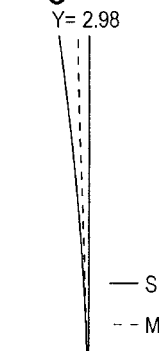
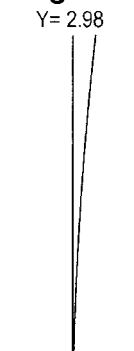
Fig. 16A  Fig. 16B  Fig. 16C  Fig. 16D FNo.= 4.0

- 0.1   0.1
SPHERICAL
ABERRATION

CHROMATIC
ABERRATION

W=4.6

- 0.01   0.01
LATERAL
CHROMATIC
ABERRATION

W=4.6

- 0.05   0.05
ASTIGMATISM

W=4.6

-1   (%)   1
DISTORTION

H= 4.64

- 0.1   0.1
SPHERICAL
ABERRATION

CHROMATIC
ABERRATION

Y= 2.98

- 0.01   0.01
LATERAL
CHROMATIC
ABERRATION

Y= 2.98

- 0.05   0.05
ASTIGMATISM

Y= 2.98

-1   (%)   1
DISTORTION

H= 4.64

-0.1   0.1
SPHERICAL
ABERRATION

CHROMATIC
ABERRATION

—— d Line
······· g Line
---- C Line

Y= 2.98

-0.01   0.01
LATERAL
CHROMATIC
ABERRATION

Y= 2.98

—— S
-- M

-0.05   0.05
ASTIGMATISM

Y= 2.98

-1  (%)  1
DISTORTION

H= 4.64

-0.1   0.1
SPHERICAL
ABERRATION

CHROMATIC
ABERRATION

—— d Line
······· g Line
---- C Line

Y= 2.98

-0.01   0.01
LATERAL
CHROMATIC
ABERRATION

Y= 2.98

—— S
-- M

-0.05   0.05
ASTIGMATISM

Y= 2.98

-1  (%)  1
DISTORTION

FOCUSING APPARATUS OF A TELESCOPIC LENS SYSTEM

BACKGROUND OF THE INVENTION

1. Field of the Invention

The present invention relates to a focusing apparatus of a telescopic lens system, and in particular, relates to a focusing apparatus of a telescopic lens system, which is appropriate to be used in combination with a camera having an autofocusing mechanism.

2. Description of the Prior Art

A photographing lens system, which is used in a camera having an autofocusing mechanism, includes a focusing mechanism which moves either the entire photographing lens system or a portion thereof in the optical axis direction by operating a lens moving mechanism constituted by a combination of a motor and gear trains, in accordance with focal-position information detected by an AF module.

Especially in a telescopic lens system, the optical system itself is bulky and heavy. Therefore some telescopic lens systems employ an inner-focusing mechanism in order to reduce the weight of a lens group to be moved for focusing, and reduce the load imposed on the motor and the gear trains of the lens moving mechanism.

An AF module employed in a conventional autofocusing mechanism is to detect the amount of defocus. Accordingly, a traveling distance of a lens group to be moved for focusing cannot be obtained directly from such an AF module. The lens moving mechanism and the AF module are therefore activated at the same time so that both the amount of defocus and an optimum traveling distance of a lens group to be moved for focusing are obtained.

However, the longer the focal length of the optical system becomes, the larger the change in the amount of defocus is with respect to the traveling distance of a lens group. There are some cases where the amount of defocus exceeds the detection-capability of the AF module, as a result. Accordingly, in a combination of a conventional telescopic lens system and an autofocusing mechanism, an optimum traveling distance of a lens group cannot be detected. Due to this reason, there are some cases where an in-focus state cannot be detected.

Furthermore, in order to miniaturize the autofocusing mechanism, it is necessary to also miniaturize the motor which drives the autofocusing mechanism; however, the driving torque of the motor is reduced accordingly. Consequently, a lens group which is moved in order to perform focusing also needs to be miniaturized. In particular, in a telescopic lens system in which the focal length of the optical system thereof is long, an inner-focusing mechanism which is designed to move a portion of the optical system has to be employed in order to reduce the weight of a lens group to be moved for focusing. However, an inner-focusing mechanism inevitably makes the optical system complicated, and an increase of production cost is caused.

SUMMARY OF THE INVENTION

The present invention is devised in order to eliminate the above-mentioned drawbacks in the prior art, and is to provide a telescopic lens system in which a manual focusing operation and an autofocusing mechanism are performed in an associated manner without utilizing complicated mechanisms and optical systems nor causing an increase of production costs.

As an aspect of the present invention, there is provided a focusing apparatus applied to a telescopic lens system including more than two lens groups. The focusing apparatus includes two focusing mechanisms which are operable independently from each other, and are adapted to vary both absolute and relative positions of two lens groups in the optical axis direction.

Due to this arrangement, the two focusing mechanisms can be used as a manual focusing mechanism and an autofocusing mechanism respectively, so that there is no need to provide a complicated mechanism such as a clutch and the like.

The focusing apparatus of a telescopic lens system according to the present invention can be applied, regardless of a lens arrangement, to a lens system in general in which more than two lens groups are operated as the focusing lens groups. More specifically, the focusing apparatus can be applied to a Petzval-type optical system including a positive powered (hereinafter, positive) first lens group constituted by a positive lens element and a negative powered (hereinafter, negative) lens element, and a positive second lens group constituted by a positive lens element and a negative lens element. A Petzval-type optical system is applied to a telescopic lens system and the like due to a feature that optimum optical performance can be attained with a smaller number of lens elements, though a Petzval-type optical system has a drawback of a narrower angle-of-view.

According to the present invention, in a telescopic lens system constituted by a Petzval-type optical system, the manual focusing mechanism roughly moves any one of the entire optical system, the positive first lens group and the positive second lens group; and further, the autofocusing mechanism, which is independent from the manual focusing mechanism, and is electrically activated, precisely moves either one of the first lens group and the second lens group in order to obtain an in-focus state of an object.

Furthermore, according to the above structure, the traveling distance of the positive first or second lens group by the autofocusing mechanism can be made more minute (very short distance), so that the detection-precision on defocus by the AF module can be enhanced.

Still further, according to the above structure, the traveling distance necessary for focusing is shared by the positive first lens group and the positive second lens group. The traveling distance of the first lens group or the second lens group is shorter compared with that of the first lens group or the second lens group in a conventional focusing mechanism in which only one of the first and second lens groups is moved for focusing. Consequently, the change in optical performance due to the change in the distance between the positive first lens group and the positive second lens group is made smaller, according to the present invention. In other words, a complicated optical system such as an inner-focusing mechanism is not required, and an optical system similar to a conventional Petzval-type optical system can be utilized.

More specifically, the focusing apparatus of a telescopic lens system according to the present invention includes the first lens group and the second lens group in this order from the object. The two focusing mechanisms move the first lens group and the second lens group independently and respectively in the optical axis direction.

In the above-mentioned structure, the first and second lens groups preferably satisfy the following condition:

$$0.4 < |T_I/T_{II}| < 2.5 \quad (1)$$

wherein $T_I$ designates the traveling distance of the first lens group required for focusing from an infinite distance to a finite photographing distance, and $T_{II}$ designates the traveling distance of the second lens group required for focusing from an infinite distance to a finite photographing distance.

The first lens group and the second lens group can further satisfy the following condition:

$$0.15 < D_{I-II}/f < 0.7 \qquad (2)$$

wherein $D_{I-II}$ designates the distance between the first lens group and the second lens group when an object at an infinite distance is in an in-focus state; and f designates the focal length of the entire telescopic lens system.

The first lens group and the second lens group are respectively constituted by a combination of a positive lens element and a negative lens element, and the focusing apparatus of a telescopic lens system preferably satisfies the following conditions:

$$|SC_I/SC| < 0.8 \qquad (3)$$

$$20 < v_{Ip} - v_{In} \qquad (4)$$

wherein $SC_I$ designates the total sum of the reciprocal of the product of the focal length and the Abbe number $(1/(fi*vi))$ of each lens element in the first lens group; and SC designates the total sum of the reciprocal of the product of the focal lengths and the Abbe number$(1/(fi*vi))$ of each lens elements in the entire telescopic lens system.

$v_{Ip}$ designates the Abbe number of the positive lens element of the first lens group; and $v_{In}$ designates the Abbe number of the negative lens element of the first lens group.

One of the two focusing mechanisms can include a manual focusing mechanism which moves one lens group in the optical axis direction via a manual operation; and the other thereof can include an electric autofocusing mechanism which is activated by an electric means, e.g., a motor, and moves the other lens group in the optical axis direction.

The manual focusing mechanism can be applied to the first lens group or the second lens group, and the autofocusing mechanism can be applied to the second lens group or the first lens group.

Alternatively, the focusing apparatus of a telescopic lens system according to the present invention includes the first lens group and the second lens group in this order from the object. One of the two focusing mechanisms moves the entire telescopic lens system in the optical axis direction; and the other thereof moves the first lens group in the optical axis direction.

The entire telescopic lens system and the first lens group preferably satisfy the following condition:

$$0.2 < |T_A/T_I| < 1.5 \qquad (5)$$

wherein $T_A$ designates the traveling distance of the entire telescopic lens system required for focusing from an infinite distance to a finite photographing distance; and $T_I$ designates the traveling distance of the first lens group required for focusing from an infinite distance to a finite photographing distance.

Note that the focusing apparatus of a telescopic lens system in which one focusing mechanism moves the entire telescopic lens system, and the other moves the first lens group preferably satisfies conditions (6) to (8) corresponding to the above-explained conditions (2) to (4).

Moreover, the focusing apparatus of a telescopic lens system according to the present invention includes the first lens group and the second lens group in this order from the object. One of the two focusing mechanisms moves the entire telescopic lens system in, the optical axis direction; and the other of the two focusing mechanisms moves the second lens group in the optical axis direction.

The entire telescopic lens system and the second lens group preferably satisfy the following condition:

$$0.2 < |T_A/T_{II}| < 1.5 \qquad (9)$$

wherein $T_A$ designates the traveling distance of the entire telescopic lens system required for focusing from an infinite distance to a finite photographing distance; and $T_{II}$ designates the traveling distance of the second lens group required for focusing from an infinite distance to a finite photographing distance.

Note that the focusing apparatus of a telescopic lens system in which one focusing mechanism moves the entire telescopic lens system, and the other moves the second lens group preferably satisfies conditions (10) to (12) corresponding to the above-explained conditions (2) to (4).

As explained, the focusing apparatus of a telescopic lens system according to the present invention can be applied, regardless of a lens arrangement, to a lens system in general. For example, in the case of a three-lens-group arrangement including a positive first lens group, a negative second lens group and a positive third lens group, in this order from the object, the two focusing mechanisms can move the positive first lens group and the positive third lens group respectively; or the two focusing mechanisms can move the positive first lens group and the negative second lens group respectively.

In the case of the telescopic lens system including the first lens group and the second lens group, in this order from the object, the first and second lens groups can be constituted by a positive lens group, and preferably satisfy the following condition:

$$0.2 < |T_A/T_I| < 0.8 \qquad (13)$$

wherein $T_A$ designates the traveling distance of the entire telescopic lens system required for focusing from an infinite distance to a finite photographing distance; and $T_I$ designates the traveling distance of the first lens group required for focusing from an infinite distance to a finite photographing distance.

The present disclosure relates to subject matter contained in Japanese Patent Application No. 2001-301873 (filed on Sep. 28, 2001) which is expressly incorporated herein in its entirety.

BRIEF DESCRIPTION OF THE DRAWINGS

The present invention will be discussed below in detail with reference to the accompanying drawings, in which:

FIGS. 11A, 11B, 11C and 11D show aberrations when a photographic magnification is set to −0.02 by moving the first lens group;

FIGS. 12A, 12B, 12C and 12D show aberrations when a photographic magnification is set to −0.02 by moving the second lens group;

FIGS. 13A, 13B, 13C and 13D show aberrations with respect to a third embodiment of the telescopic lens system shown in FIG. 4, when an object at an infinite distance is in an in-focus state;

FIGS. 14A, 14B, 14C and 14D show aberrations when a photographic magnification is set to −0.02 by moving the entire telescopic lens system;

FIGS. 15A, 15B, 15C and 15D show aberrations when a photographic magnification is set to −0.02 by moving the first lens group;

FIGS. 16A, 16B, 16C and 16D show aberrations when a photographic magnification is set to −0.02 by moving the second lens group;

DESCRIPTION OF THE PREFERRED EMBODIMENTS

Figure 1:
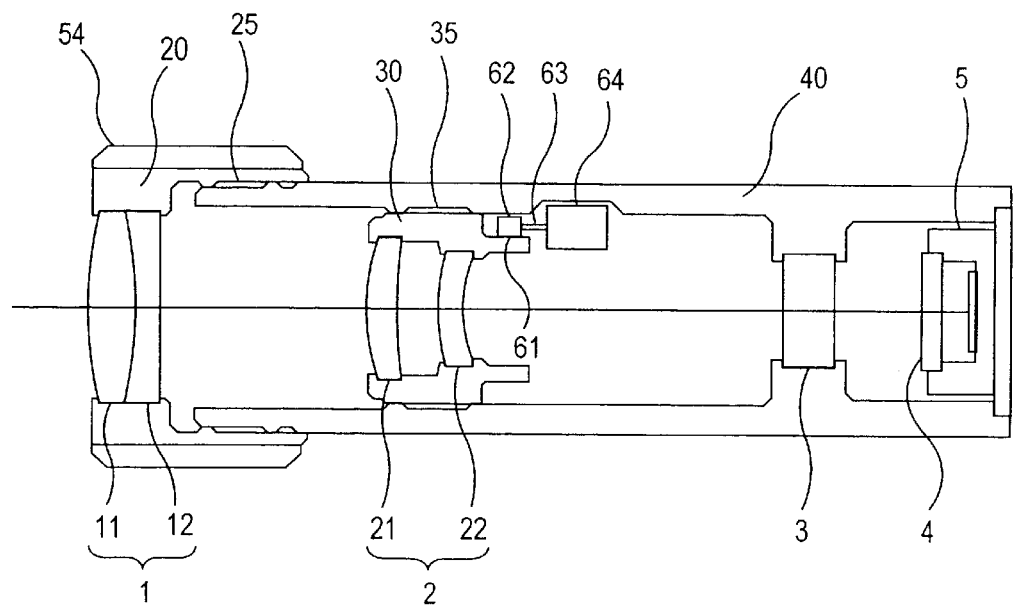
FIG. 1 is a vertical sectional view showing a first example of a focusing apparatus of a telescopic lens system, according to the present invention.

FIG. 1 is a vertical sectional view showing the first example of a focusing apparatus of a telescopic lens system, according to the present invention.

The telescopic lens system of the focusing apparatus includes a positive lens group 1 constituted by cemented lens elements of a positive first lens element 11 and a negative lens element 12, and a positive second lens group 2 constituted by a positive third lens element 21 and a negative fourth lens element 22, in this order from the object. A filter 3 having a low-pass filter and an infrared-cut filter and the like (shown as a single filter element) is provided on the image-side of the negative fourth lens element 22. Furthermore, a cover glass 4 is fixed to the front surface of an image pick-up device (CCD) 5.

The above-mentioned members are provided inside a stationary lens barrel 40, and the image pick-up device (CCD) 5 is fixed at the image-side end of the stationary lens barrel 40.

The positive first lens group 1 is supported in a first-lens-group frame 20. The first-lens-group frame 20 is supported by the stationary lens barrel 40 through a helicoid mechanism 25. Accordingly, the positive first lens group 1 (first-lens-group frame 20) moves in the optical axis direction when rotated. Furthermore, the positive second lens group 2 is supported in a second-lens-group frame 30. The second-lens-group frame 30 is supported in the stationary lens barrel 40 through a helicoid mechanism 35. Accordingly, the positive second lens group 2 (second-lens-group frame 30) moves in the optical axis direction when rotated.

A manual operation member (focusing ring) 54 is fixed to the outer peripheral portion of the first-lens-group frame 20. When the manual operation member 54 is manually rotated, the first-lens-group frame 20 which by supported by the stationary lens barrel 40 through the helicoid mechanism 25 is moved in the optical axis direction. Consequently, the positive first lens group 1 moves in the optical axis direction, so that focusing operation is carried out.

A spur gear 61 is provided on the image-side end of the second-lens-group frame 30, and a pinion gear 62 is in mesh with the spur gear 61. The pinion gear 62 is rotationally driven by an output spindle 63 of a motor 64. When the motor 64 is rotated based on the traveling distance of the positive second lens group 2 detected by the AF module (not shown), the second-lens-group frame 30 which is supported in the stationary lens barrel 40 is moved in the optical axis direction through the helicoid mechanism 35. Consequently, the positive second lens group 2 moves in the optical axis direction, so that focusing operation is carried out. In other words, a focusing operation is carried out by varying the absolute positions and relative positions of the positive first lens group 1 and the positive second lens group 2 through two focusing mechanisms. Note that the helicoid mechanism 35, the spur gear 61, the pinion gear 62, the output spindle 63 and the motor 64 constitute an electric autofocusing mechanism.

Conditions (1) through (4) are desirable for a Petzval-type telescopic lens system, as explained, in which the positive first lens group 1 and the positive second lens groups 2 are independently movable in the optical axis direction, through the two focusing mechanisms described above.

Condition (1) specifies the traveling distances of the positive first lens group 1 and the positive second lens group 2 in order to optimize precision on an autofocusing operation and operability of the manual focusing operation.

If $|T_I T_{II}|$ exceeds the upper limit of condition (1), the fluctuation of defocus amount with respect to the traveling distance of the positive second lens group 2 becomes too large. Consequently, in the structure shown in FIG. 1, the defocus amount fluctuates greatly upon a slight rotation of the motor 64, so that it becomes difficult to obtain an in-focus state by the an electric autofocusing mechanism.

If $|T_I T_{II}|$ exceeds the lower limit of condition (1), the fluctuation of defocus amount with respect to the traveling distance of the positive first lens group 1 becomes too large. Consequently, in the structure shown in FIG. 1, the defocus amount fluctuates greatly upon a slight rotation of the manual operation member 54, so that a manual focusing operation by the manual operation member 54 becomes difficult.

Condition (2) is for optimizing the distance between the positive first lens group 1 and the positive second lens group 2. By satisfying this condition, a space through which the positive first lens group 1 and the positive second lens group 2 are moved can be secured, and enlargement of the overall length of the telescopic lens system can be prevented.

If $D_{I\text{-}II}/f$ exceeds the lower limit of condition (2), the distance between the positive first lens group 1 and the positive second lens group 2 becomes too short, so that the space through which the positive first lens group 1 and the positive second lens group 2 are moved cannot be secured.

If $D_{I\text{-}II}/f$ exceeds the upper limit of condition (2), the overall length of the telescopic lens system becomes too long.

Condition (3) is for performing the correcting of chromatic aberration solely by the positive first lens group 1. By satisfying this condition, fluctuations in chromatic aberration can be reduced even when the positional relationship between the positive first lens group 1 and the positive second lens group 2 changes due to a focusing operation.

If $|SC_f/SC|$ exceeds the upper limit of condition (3), chromatic aberration fluctuates by a focusing operation.

In the positive first lens group 1 in which the function of the correcting of chromatic aberration is specified by condition (3), condition (4) is for setting a difference between the Abbe numbers of the positive lens element 11 and the negative lens element 12 larger. By satisfying this condition, chromatic aberration can suitably be corrected.

If $v_{Ip} - v_{In}$ exceeds the lower limit of condition (4), the power of the first lens element 11 and that of the second lens element 12 of the positive first lens group 1 have to be made stronger in order to obtain suitably correct chromatic aberration. Consequently, higher order spherical aberration and coma excessively occur, so that preferable optical performance cannot be attained. Moreover, fluctuations of aberrations due to decentration of lens elements become larger, so that higher machining precision is required, and an increase of manufacturing cost is caused.

Figure 2:
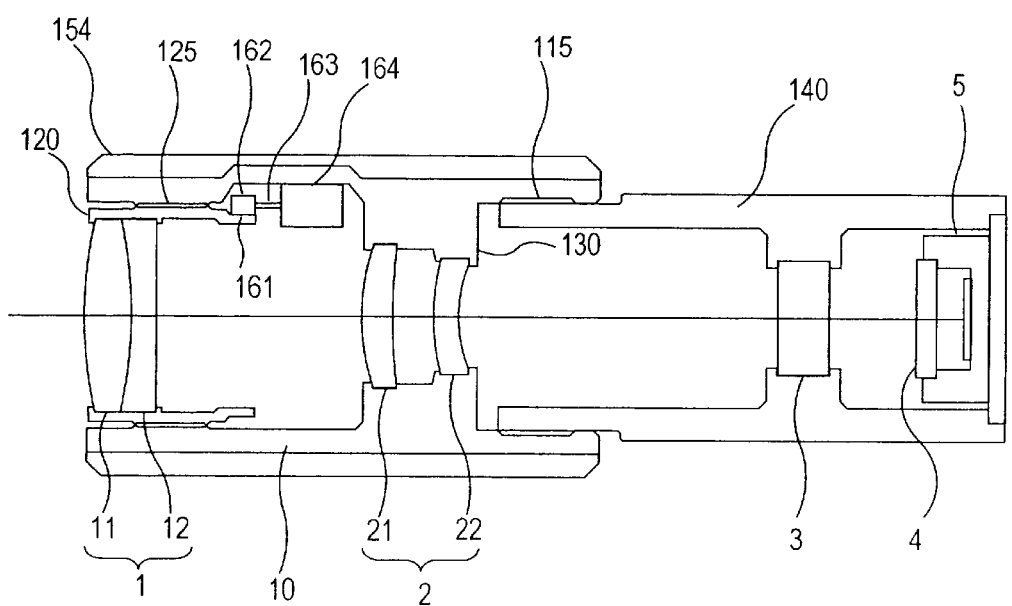
FIG. 2 is a vertical sectional view showing a second example of the focusing apparatus of a telescopic lens system, according to the present invention.

FIG. 2 is a vertical sectional view showing the second example of the focusing apparatus of a telescopic lens system, according to the present invention. The telescopic lens system of this focusing apparatus is the same as that of the first example. In the second example, a movable lens barrel 10 is supported by a stationary lens barrel 140 at the object-side thereof through a movable-lens-barrel helicoid mechanism 115. The positive second lens group 2 is supported in a second-lens-group frame 130 which is formed integral with the movable lens barrel 10.

The positive first lens group 1 is supported in a first-lens-group frame 120, and the first-lens-group frame 120 is supported in the movable lens barrel 10 through a first-lens-group helicoid mechanism 125. Accordingly, when the movable lens barrel 10 is rotated with respect to the stationary lens barrel 140, both the positive first lens group 1 and the positive second lens group 2, i.e., the entire optical system, move in the optical axis direction; and when the first-lens-group frame 120 is rotated with respect to the movable lens barrel 10, the positive first lens group 1 solely moves in the optical axis direction.

A manual operation member (focusing ring) 154 is fixed to the outer peripheral portion of the movable lens barrel 10. When the manual operation member 154 is manually rotated, the movable lens barrel 10 which is supported by the stationary lens barrel 140 through the movable-lens-barrel helicoid mechanism 115 rotates, so that a focusing operation is carried out by the simultaneous movement of the positive first lens group 1 and the positive second lens group 2 in the optical axis direction.

A spur gear 161 is provided on the image-side end of the first-lens-group frame 120, and a pinion gear 162 is in mesh with the spur gear 161. The pinion gear 162 is rotationally driven by the output spindle 163 of a motor 164. When the motor 164 is rotated based on the traveling distance of the positive first lens group 1 lens group detected by the AF module (not shown), the first-lens-group frame 120 which is supported in the movable lens barrel 10 is rotated through the first-lens-group helicoid mechanism 125, and the positive first lens group 1 is moved in the optical axis direction, so that a focusing operation is performed. In other words, a focusing operation is carried out by varying the absolute positions and relative positions of the positive first lens group 1 and the positive second lens group 2 through two focusing mechanisms. Note that the first-lens-group helicoid mechanism 125, the spur gear 161, the pinion gear 162, the output spindle 163 and the motor 164 constitute the electric autofocusing mechanism.

Conditions (5) through (8) are desirable for a Petzval-type telescopic lens system, as explained, in which (i) the positive first lens group 1 and the positive second lens groups 2, i.e., the entire optical system, are movable at the same time in the optical axis direction; and (ii) the positive first lens group 1 is movable in the optical axis direction, through the two focusing mechanisms.

Condition (5) specifies the traveling distances of the entire optical system and the positive lens group 1 in order to optimize precision on an autofocusing operation and operability of the manual focusing operation.

If $|T_A/T_I|$ exceeds the lower limit of condition (5), the fluctuation of defocus amount with respect to the traveling distance of the entire optical system becomes too large. Consequently, in the structure shown in FIG. 2, the defocus amount fluctuates greatly upon a slight rotation of the manual operation member 154, so that a manual focusing operation by the manual operation member 54 becomes difficult.

If $|T_A/T_I|$ exceeds the upper limit of condition (5), the fluctuation of defocus amount with respect to the traveling distance of the positive first lens group 1 becomes too large. Consequently, in the structure shown in FIG. 2, the defocus amount fluctuates greatly upon a slight rotation of the motor 164, so that it becomes difficult to obtain an in-focus state by the electric autofocusing mechanism.

Conditions (6) through (8) correspond to conditions (2) through (4), and hence, explanations thereof are omitted.

Figure 3:
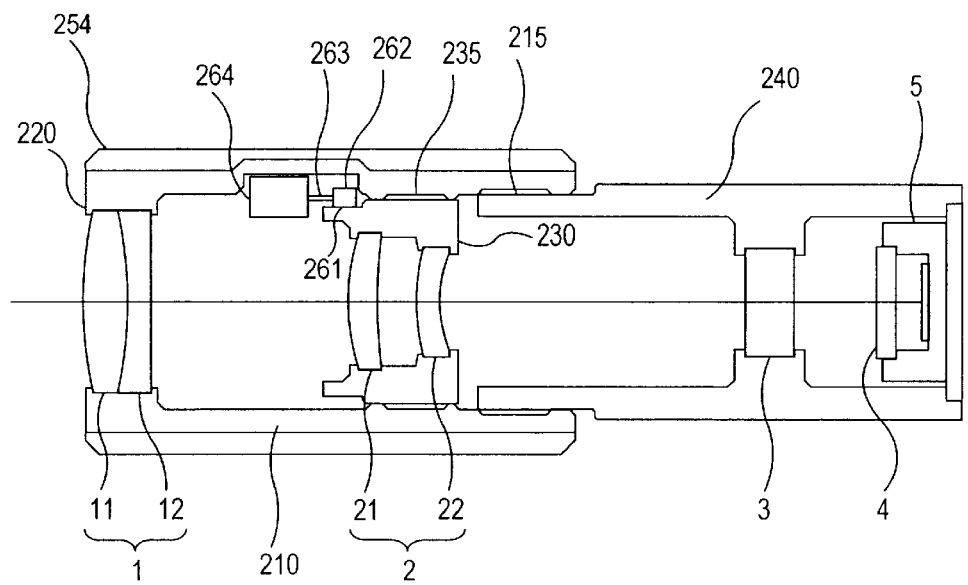
FIG. 3 is a vertical sectional view showing a third example of the focusing apparatus of a telescopic lens system, according to the present invention.

FIG. 3 is a vertical sectional view showing the third example of the focusing apparatus of a telescopic lens system, according to the present invention. The telescopic lens system of this focusing apparatus is the same as that of the first example. In the third example, a movable lens barrel 210 is supported by the stationary lens barrel 240 at the object-side thereof through a movable-lens-barrel helicoid mechanism 215. The positive first lens group 1 is supported by a first-lens-group frame 220 which is formed integral with the movable lens barrel 210.

The positive second lens group 2 is supported in a second-lens-group frame 230, and the second-lens-group frame 230 is supported in the movable barrel 210 through a second-lens-group helicoid mechanism 235. Accordingly, when the movable barrel 210 is rotated with respect to the stationary lens barrel 240, both the positive first lens group 1 and the positive second lens group 2, i.e., the entire optical system, move in the optical axis direction; and when the second-lens-group frame 230 is rotated with respect to the movable lens barrel 210, the positive second lens group 2 solely moves in the optical axis direction.

A manual operation member (focusing ring) 254 is fixed to the outer peripheral portion of the movable lens barrel 210. When the manual operation member 254 is manually rotated, the movable barrel 210 which is supported by the stationary lens barrel 240 through a stationary-lens-barrel helicoid mechanism 215 rotates, so that a focusing operation is carried out by the movement of the positive first lens group 1 and the positive second lens group 2 at the same time in the optical axis direction.

A spur gear 261 is provided on the object-side end of the second-lens-group frame 230, and a pinion gear 262 is in mesh with the spur gear 261. The pinion gear 262 is rotationally driven by an output spindle 263 of a motor 264. When the motor 264 is rotated based on the traveling distance of the positive second lens group 2 detected by the AF module (not shown), the second-lens-group frame 230 which is supported in the movable lens barrel 210 is rotated through the second-lens-group helicoid mechanism 235, and the positive second lens group 2 is moved in the optical axis direction, so that a focusing operation is performed. In other words, a focusing operation is carried out by varying the absolute positions and relative positions of the positive first lens group 1 and the positive second lens group 2 through two focusing mechanisms. Note that the second-lens-group helicoid mechanism 235, the spur gear 261, the pinion gear 262, the output spindle 263 and the motor 264 constitute the electric autofocusing mechanism.

Conditions (9) through (12) are desirable for a Petzval-type telescopic lens system, as explained, in which (i) the positive first lens group 1 and the positive second lens groups 2, i.e., the entire optical system, are movable at the same time in the optical axis direction; and (ii) the positive second lens group 2 is movable in the optical axis direction, through the two focusing mechanisms.

Condition (9) specifies the traveling distances of the entire optical system and the positive second lens group 2 in order to optimize precision on an autofocusing operation and operability of the manual focusing operation.

If $|T_A/T_H|$ exceeds the upper limit of condition (9), the fluctuation of defocus amount with respect to the traveling distance of the positive second lens group 2 becomes too large. Consequently, in the structure shown in FIG. 3, the defocus amount fluctuates greatly upon a slight rotation of the motor 264, so that it becomes difficult to obtain an in-focus state by the electric autofocusing mechanism.

If $|T_A/T_H|$ exceeds the lower limit of condition (9), the fluctuation of defocus amount with respect to the traveling distance of the entire optical system becomes too large. Consequently, in the structure shown in FIG. 3, the defocus amount fluctuates greatly upon a slight rotation of the manual operation member 254, so that a manual focusing operation by the manual operation member 254 becomes difficult.

Conditions (10) through (12) correspond with conditions (2) through (4), and hence, explanations thereof are omitted.

Specific numerical data of the embodiments will be described hereinafter. In the diagrams of chromatic aberration represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, $F_{NO}$ designates the f-number, f designates the focal length of the entire zoom lens system, FB designates the back focal distance, W designates the incident angle (°), H designates the incident height of an axial bundle of light rays, Y designates the image height, R designates the radius of curvature, D designates the lens-element thickness or distance between lens elements, Nd designates the refractive index of the d-line, and vd designates the Abbe number.

In the first through fourth embodiments of the telescopic lens system, any of the following moving patterns of the lens groups and the entire optical system is possible by the two focusing mechanisms:

(i) the positive first lens group 1 and the positive second lens group 2 are respectively moved in the optical axis direction;

(ii) the entire optical system and the positive first lens group 1 are moved in the optical axis direction; and (iii) the entire optical system and the positive second lens group 2 are moved in the optical axis direction.

Embodiment 1

Figure 4:
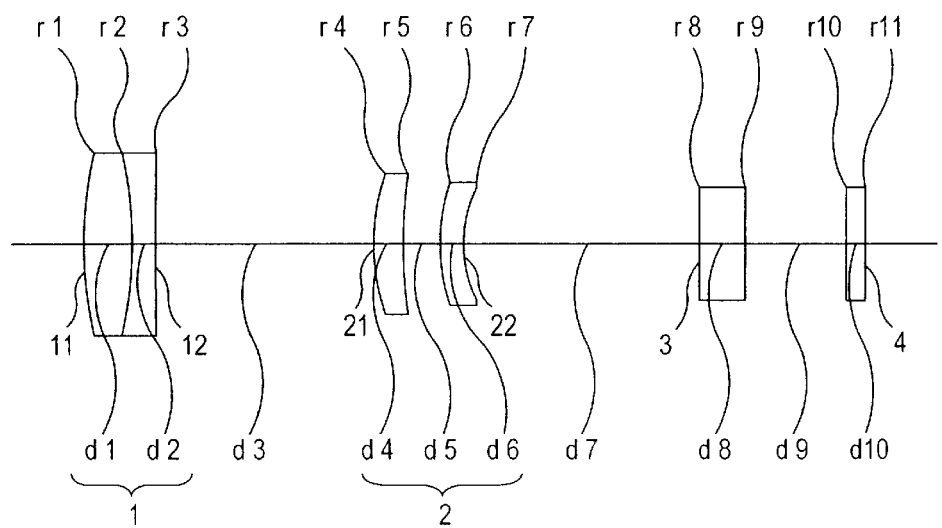
FIG. 4 is a lens arrangement of a telescopic lens system to which the focusing apparatuses shown in FIGS. 1 through 3 are applied.
Figure 5A:
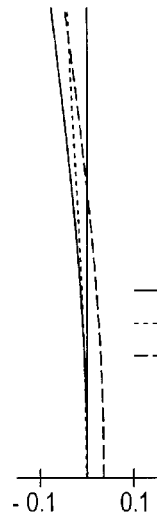
FIGS. 5A, 5B, 5C and 5D show aberrations with respect to a first embodiment of the telescopic lens system shown in FIG. 4, when an object at an infinite distance is in an in-focus state.
Figure 5B:
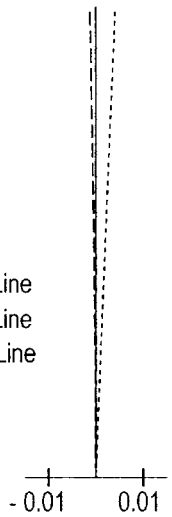
Figure 5C:
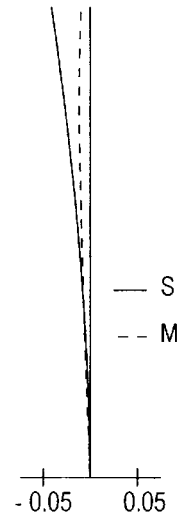
Figure 5D:
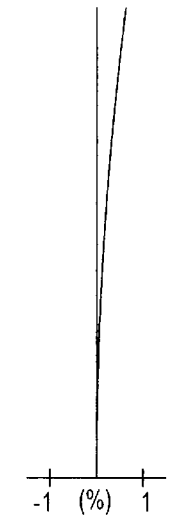
Figure 6A:
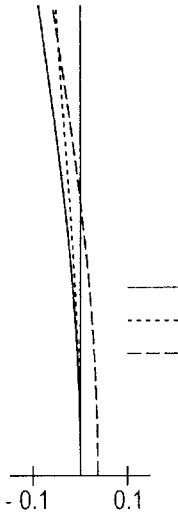
FIGS. 6A, 6B, 6C and 6D show aberrations when a photographic magnification is set to −0.02 by moving the entire telescopic lens system.
Figure 6B:
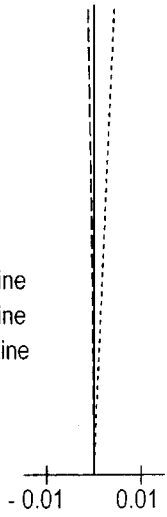
Figure 6C:
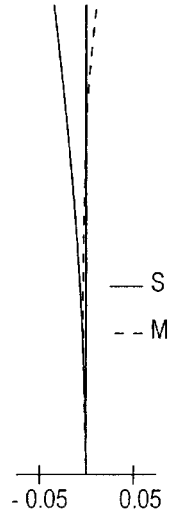
Figure 6D:
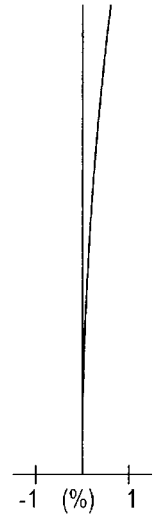
Figure 7A:
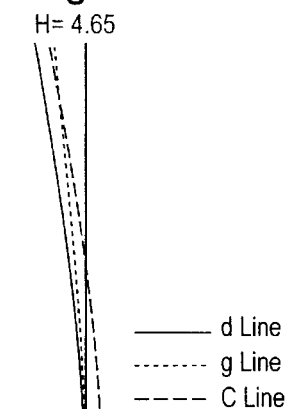
FIGS. 7A, 7B, 7C and 7D show aberrations when a photographic magnification is set to −0.02 by moving the first lens group.
Figure 7B:
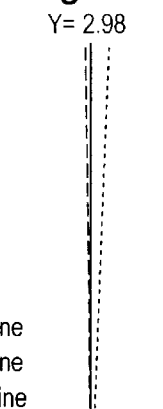
Figure 7C:
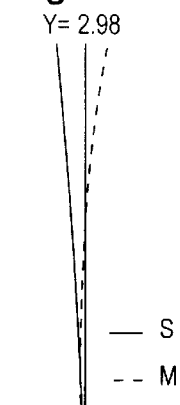
Figure 7D:
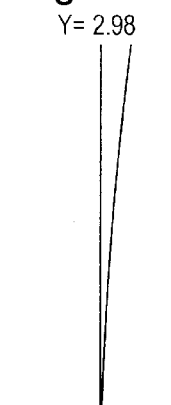
Figure 8A:
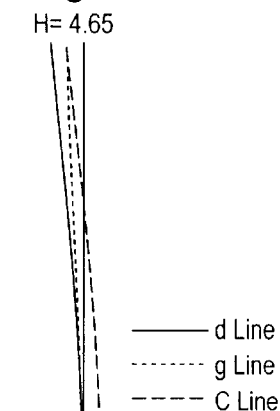
FIGS. 8A, 8B, 8C and 8D show aberrations when a photographic magnification is set to −0.02 by moving the second lens group.
Figure 8B:
Figure 8C:
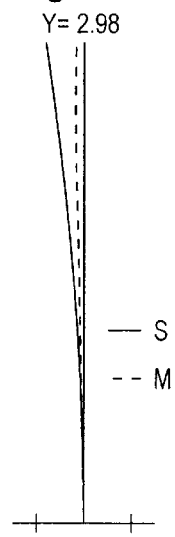
Figure 8D:
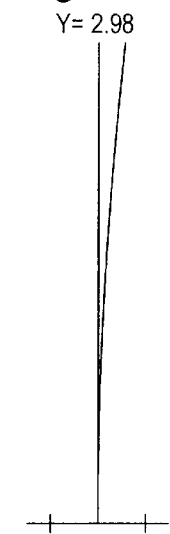
Figure 9A:
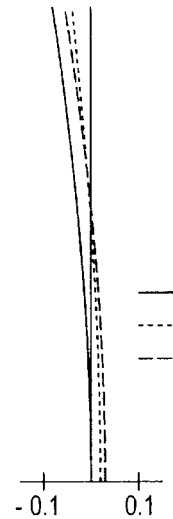
FIGS. 9A, 9B, 9C and 9D show aberrations with respect to a second embodiment of the telescopic lens system shown in FIG. 4, when an object at an infinite distance is in an in-focus state.
Figure 9B:
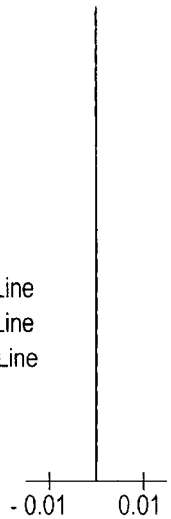
Figure 9C:
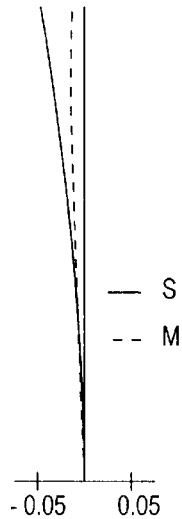
Figure 9D:
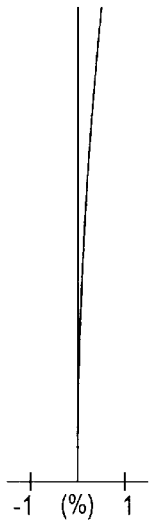
Figure 10A:
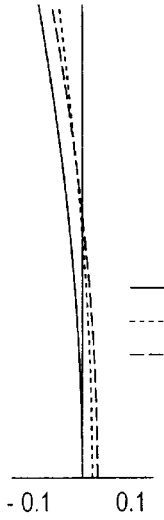
FIGS. 10A, 10B, 10C and 10D show aberrations when a photographic magnification is set to −0.02 by moving the entire telescopic lens system.
Figure 10B:
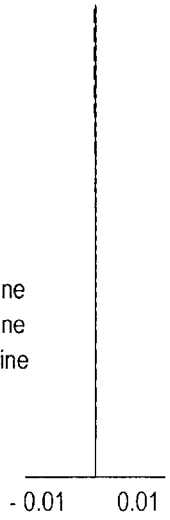
Figure 10C:
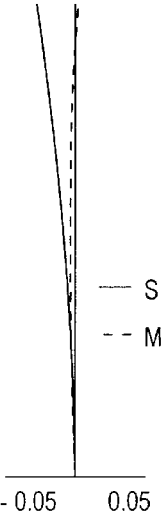
Figure 10D:
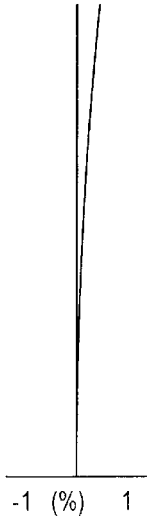
Figure 17A:
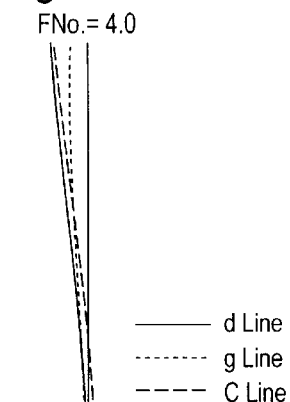
FIGS. 17A, 17B, 17C and 17D show aberrations with respect to a fourth embodiment of the telescopic lens system shown in FIG. 4, when an object at an infinite distance is in an in-focus state.
Figure 17B:
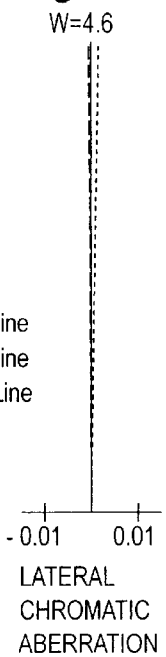
Figure 17C:
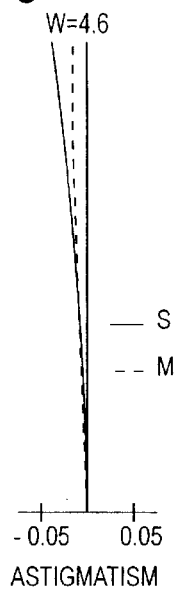
Figure 17D:
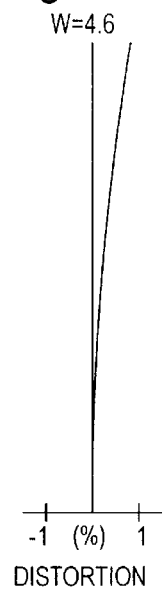
Figure 18A:
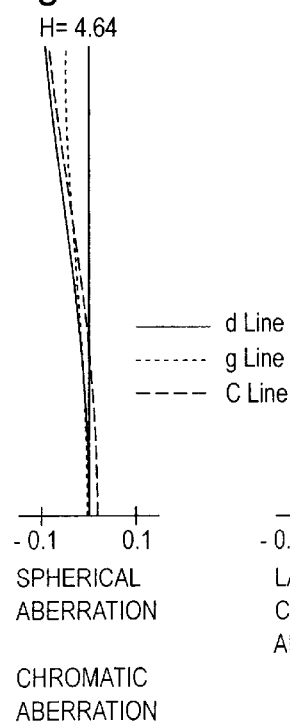
FIGS. 18A, 18B, 18C and 18D show aberrations when a photographic magnification is set to −0.02 by moving the entire telescopic lens system.
Figure 18B:
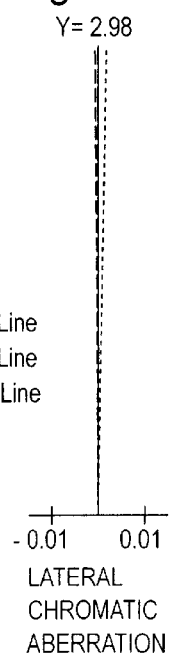
Figure 18C:
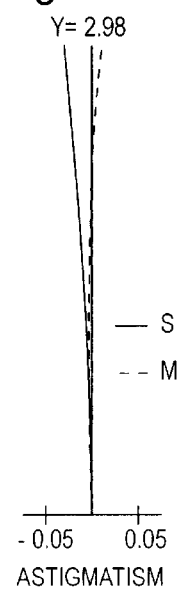
Figure 18D:
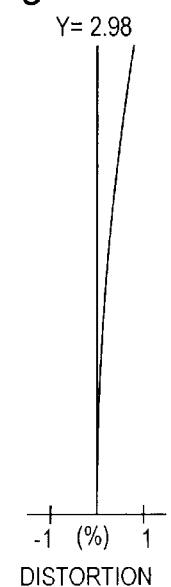
Figure 19A:
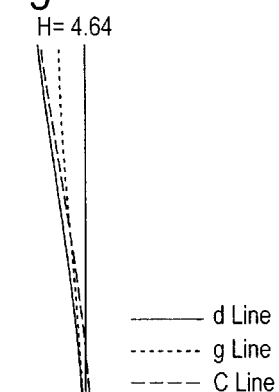
FIGS. 19A, 19B, 19C and 19D show aberrations when a photographic magnification is set to −0.02 by moving the first lens group.
Figure 19B:
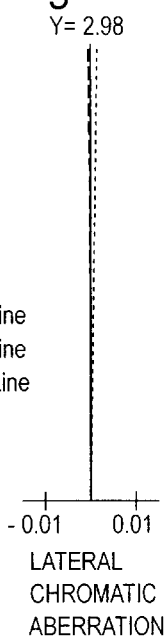
Figure 19C:
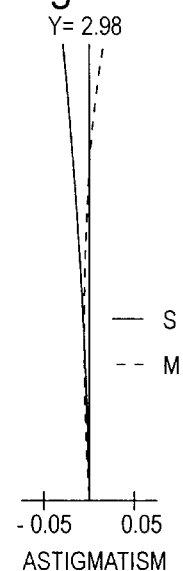
Figure 19D:
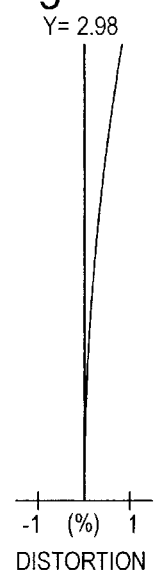
Figure 20A:
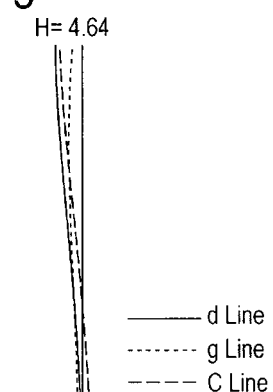
FIGS. 20A, 20B, 20C and 20D show aberrations when a photographic magnification is set to −0.02 by moving the second lens group.
Figure 20B:
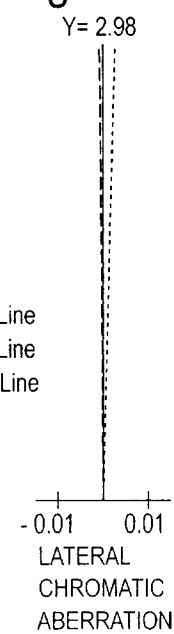
Figure 20C:
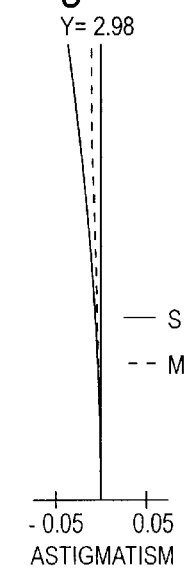
Figure 20D:
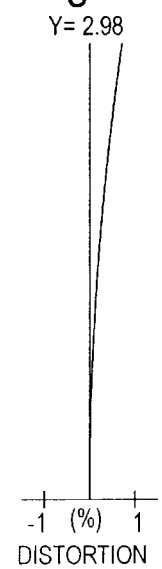

FIG. 4 is a lens arrangement of a telescopic lens system to which the focusing apparatuses shown in FIGS. 1 through 3 are applied. FIGS. 5A through 5D show aberrations with respect to the first embodiment the telescopic lens system shown in FIG. 4, when an object at an infinite distance is in an in-focus state. FIGS. 6A through 6D show aberrations when a photographic magnification is set to −0.02 by moving the entire telescopic lens system. FIGS. 7A through 7D show aberrations when a photographic magnification is set to −0.02 by moving the first lens group. FIGS. 8A through 8D show aberrations when a photographic magnification is set to −0.02 by moving the second lens group. Table 1 shows the numerical data of the first embodiment.

TABLE 1

FNo. = 1:4.0
f = 37.10
W = 4.4
FB = 0.50

| Surface No. | R | D | Nd | vd |
|---|---|---|---|---|
| 1 | 20.276 | 2.500 | 1.51633 | 64.1 |
| 2 | −20.958 | 1.200 | 1.60342 | 38.0 |
| 3 | 316.548 | D3 | — | — |
| 4 | 11.057 | 1.500 | 1.51633 | 64.1 |
| 5 | 26.198 | 1.887 | — | — |
| 6 | 9.813 | 1.200 | 1.60342 | 38.0 |
| 7 | 6.500 | D7 | — | — |
| 8 | ∞ | 2.350 | 1.51633 | 64.1 |
| 9 | ∞ | 5.200 | — | — |
| 10 | ∞ | 1.000 | 1.51633 | 64.1 |
| 11 | ∞ | — | — | — |

TABLE 1-continued

|  | *Focusing at infinity | Movement of Entire Optical System | Movement of First Lens Group 1 | Movement of Second Lens Group 2 |
|---|---|---|---|---|
| M | 0.00 | −0.02 | −0.02 | −0.02 |
| D3 | 11.140 | 11.140 | 12.531 | 9.570 |
| D7 | 11.992 | 12.734 | 11.992 | 13.562 |
| FB | 0.50 | 0.50 | 0.50 | 0.50 |

*Focusing at infinity means that an object at an infinite distance is in an in-focus state Embodiment 2

FIGS. 9A through 9D show aberrations with respect to the second embodiment the telescopic lens system shown in FIG. 4, when an object at an infinite distance is in an in-focus state. The lens arrangement of the second embodiment is the same as that of FIG. 4. FIGS. 10A through 10D show aberrations when a photographic magnification is set to −0.02 by moving the entire telescopic lens system. FIGS. 11A through 11D show aberrations when a photographic magnification is set to −0.02 by moving the first lens group. FIGS. 12A through 12D show aberrations when a photographic magnification is set to −0.02 by moving the second lens group. Table 2 shows the numerical data of the second embodiment.

TABLE 2

FNo. = 1:4.0
f = 37.13
W = 4.4
FB = 0.50

| Surface No. | R | D | Nd | νd |
|---|---|---|---|---|
| 1 | 21.595 | 2.500 | 1.51633 | 64.1 |
| 2 | −25.986 | 1.200 | 1.62004 | 36.3 |
| 3 | 147.545 | D3 | — | — |
| 4 | 11.467 | 1.500 | 1.51633 | 64.1 |
| 5 | 30.126 | 2.000 | — | — |
| 6 | 9.019 | 1.200 | 1.62004 | 36.3 |
| 7 | 6.500 | D7 | — | — |
| 8 | ∞ | 2.350 | 1.51633 | 64.1 |
| 9 | ∞ | 5.200 | — | — |
| 10 | ∞ | 1.000 | 1.51633 | 64.1 |
| 11 | ∞ | — | — | — |

|  | *Focusing at Infinity | Movement of Entire Optical System | Movement of First Lens Group | Movement of Second Lens Group |
|---|---|---|---|---|
| M | 0.00 | −0.02 | −0.02 | −0.02 |
| D3 | 12.118 | 12.118 | 14.195 | 10.976 |
| D7 | 13.091 | 13.834 | 13.091 | 14.233 |
| FB | 0.50 | 0.50 | 0.50 | 0.50 |

*Focusing at infinity means that an object at an infinite distance is in an in-focus state Embodiment 3

FIGS. 13A through 13D show aberrations with respect to the third embodiment the telescopic lens system shown in FIG. 4, when an object at an infinite distance is in an in-focus state. FIGS. 14A through 14D show aberrations when a photographic magnification is set to −0.02 by moving the entire telescopic lens system. FIGS. 15A through 15D show aberrations when a photographic magnification is set to −0.02 by moving the first lens group. FIGS. 16A through 16D show aberrations when a photographic magnification is set to −0.02 by moving the second lens group. Table 3 shows the numerical data of the third embodiment. The lens arrangement of the third embodiment is the same as that of FIG. 4 except that for the positive lens element 11 and the negative lens element 12 of the first lens group 1 are not cemented.

TABLE 3

FNo. = 1:4.0
f = 37.11
W = 4.4
FB = 0.50

| Surface No. | R | D | Nd | νd |
|---|---|---|---|---|
| 1 | 20.400 | 2.500 | 1.49700 | 81.6 |
| 2 | −17.175 | 0.200 | — | — |
| 3 | −16.637 | 1.200 | 1.54072 | 47.2 |
| 4 | 117.829 | D4 | — | — |
| 5 | 11.196 | 1.500 | 1.58913 | 61.2 |
| 6 | 30.676 | 2.000 | — | — |
| 7 | 10.819 | 1.200 | 1.56732 | 42.8 |
| 8 | 6.500 | D8 | — | — |
| 9 | ∞ | 2.350 | 1.51633 | 64.1 |
| 10 | ∞ | 5.200 | — | — |
| 11 | ∞ | 1.000 | 1.51633 | 64.1 |
| 12 | ∞ | — | — | — |

|  | *Focusing at Infinity | Movement of Entire Optical System | Movement of First Lens Group | Movement of Second Lens Group |
|---|---|---|---|---|
| M | 0.00 | −0.02 | −0.02 | −0.02 |
| D4 | 10.000 | 10.000 | 11.864 | 8.781 |
| D8 | 12.987 | 13.729 | 12.987 | 14.206 |
| FB | 0.50 | 0.50 | 0.50 | 0.50 |

*Focusing at infinity means that an object at an infinite distance is in an in-focus state Embodiment 4

FIGS. 17A through 17D show aberrations with respect to the fourth embodiment the telescopic lens system shown in FIG. 4, when an object at an infinite distance is in an in-focus state. FIGS. 18A through 18D show aberrations when a photographic magnification is set to −0.02 by moving the entire telescopic lens system. FIGS. 19A through 19D show aberrations when a photographic magnification is set to −0.02 by moving the first lens group. FIGS. 20A through 20D show aberrations when a photographic magnification is set to −0.02 by moving the second lens group. Table 4 shows the numerical data of the fourth embodiment. The lens arrangement of the fourth embodiment is the same as that of FIG. 4 except that the positive lens element 11 and the negative lens element 12 of the first lens group 1 are not cemented.

TABLE 4

FNo. = 1:4.0
f = 37.06
W = 4.4
FB = 0.50

| Surface No. | R | D | Nd | νd |
|---|---|---|---|---|
| 1 | 18.637 | 2.500 | 1.49700 | 81.6 |
| 2 | −16.820 | 0.200 | — | — |
| 3 | −16.253 | 1.200 | 1.54072 | 47.2 |
| 4 | 341.443 | D4 | — | — |
| 5 | 11.454 | 1.500 | 1.58913 | 61.2 |
| 6 | 23.116 | 1.167 | — | — |
| 7 | 10.328 | 1.200 | 1.56732 | 42.8 |
| 8 | 6.500 | D8 | — | — |
| 9 | ∞ | 2.350 | 1.51633 | 64.1 |
| 10 | ∞ | 5.200 | — | — |
| 11 | ∞ | 1.000 | 1.51633 | 64.1 |
| 12 | ∞ | — | — | — |

TABLE 4-continued

|    | Focusing at Infinity | Movement of Entire Optical System | Movement of First Lens Group | Movement of Second Lens Group |
|----|------|--------|--------|--------|
| M  | 0.00 | −0.02  | −0.02  | −0.02  |
| D4 | 14.581 | 14.581 | 15.695 | 12.397 |
| D8 | 9.074 | 9.815 | 9.074 | 11.258 |
| FB | 0.50 | 0.50 | 0.50 | 0.50 |

*Focusing at infinity means that an object at an infinite distance is in an in-focus state The numerical values of each condition in each embodiment are shown in Table 5. Conditions (1), (5) and (9) are calculated when a photographic magnification is set to −0.02.

TABLE 5

|  | Embod. 1 | Embod. 2 | Embod. 3 | Embod. 4 |
|---|---|---|---|---|
| Condition (1) | 0.886 | 1.819 | 1.528 | 0.510 |
| Condition (2) | 0.300 | 0.326 | 0.269 | 0.393 |
| Condition (3) | 0.136 | 0.405 | 0.467 | 0.227 |
| Condition (4) | 26.1 | 27.8 | 34.4 | 34.4 |
| Condition (5) | 0.533 | 0.357 | 0.398 | 0.665 |
| Condition (9) | 0.473 | 0.650 | 0.609 | 0.339 |
| $T_I =$ | 1.391 | 2.077 | 1.864 | 1.114 |
| $T_{II} =$ | −1.570 | −1.142 | −1.219 | −2.184 |
| $T_A =$ | 0.742 | 0.743 | 0.742 | 0.741 |
| $f =$ | 37.102 | 37.131 | 37.110 | 37.056 |
| $SC_I =$ | 0.0000 | −0.0001 | −0.0001 | −0.0001 |
| $SC =$ | −0.0003 | −0.0003 | −0.0003 | −0.0003 |

As can be understood from Table 5, each embodiment satisfies each condition, and as can be understood from the aberration diagrams, the various aberrations are adequately corrected.

Figure 21:
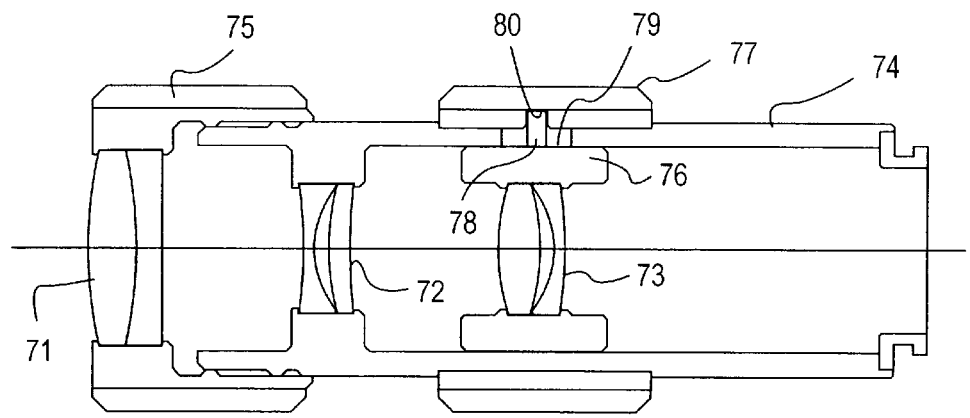
FIG. 21 is a vertical sectional view showing a fourth example of the focusing apparatus of a telescopic lens system, according to the present invention.
Figure 22:
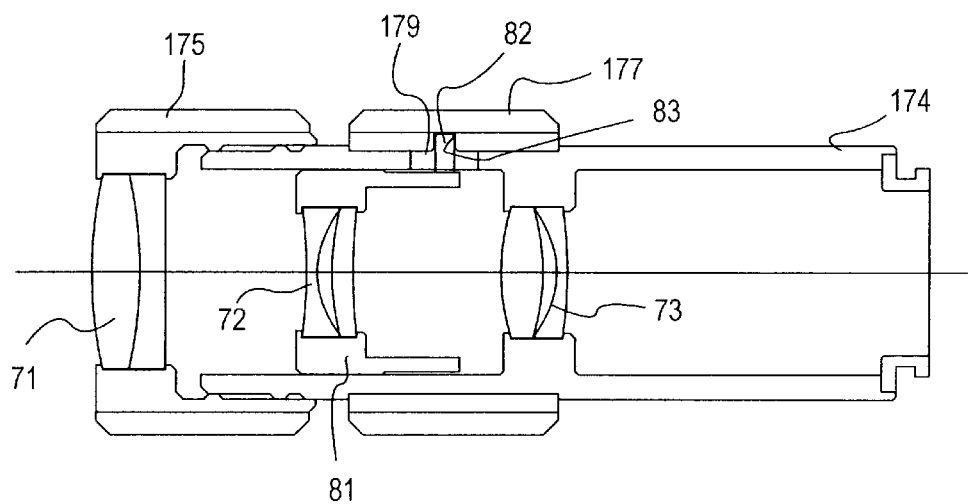
FIG. 22 is a vertical sectional view showing a fifth example of the focusing apparatus of a telescopic lens system, according to the present invention.

FIGS. 21 and 22 are vertical sectional views showing the fourth and fifth examples of the focusing apparatus of a telescopic lens system, according to the present invention. The lens systems shown in these drawings includes a positive first lens group 71, a negative second lens group 72, and a positive third lens group 73, in this order from the object.

In the example shown in FIG. 21, the negative second lens group 72 is fixed to a stationary lens barrel 74. The positive first lens group 71 is fixed to a first-lens-group frame 75 which is screw-engaged with the stationary lens barrel 74. Furthermore, the positive third lens group 73 is fixed to a third-lens-group frame 76 which is relatively movable in the stationary lens barrel 74, and a manual operation member (focusing ring) 77 is provided around the outer surface of the stationary lens barrel 74. A drive pin 78, which projects radially from the third-lens-group frame 76, fits into a linear guide groove 79 of the stationary lens barrel 74 and into a lead groove 80 of the manual operation member 77. Accordingly, when the first-lens-group frame 75 is rotated with respect to the stationary lens barrel 74, the positive first lens group 71 is moved in the optical axis direction so that a focusing operation is carried out. On the other hand, when the manual operation member 77 is rotated, the positive third lens group 73 is moved in the optical axis direction so that a focusing operation is carried out. In other words, the absolute positions and relative positions of the positive first lens group 71 and the positive third lens group 73 are varied by two focusing mechanisms for a focusing operation.

In the example shown in FIG. 22, the positive third lens group 73 is fixed to a stationary lens barrel 174. The negative second lens group 72 is fixed to a second-lens-group frame 81 which is relatively movable in the stationary lens barrel 174. A drive pin 82, which projects radically from the second-lens-group frame 81, fits into a linear guide groove 179 of the stationary lens barrel 174, and into a lead groove 83 of the manual operation member 177. Accordingly, when a first-lens-group frame 175 is rotated with respect to the stationary lens barrel 174, the positive first lens group 71 is moved in the optical axis direction so that a focusing operation is carried out. On the other hand, when the manual operation member 177 is rotated, the negative second lens group 72 is moved in the optical axis direction so that a focusing operation is carried out. In other words, the absolute positions and relative positions of the positive first lens group 71 and the negative second lens group 72 are varied by two focusing mechanisms for a focusing operation.

One of the first-lens-group frame 75 (175) and the manual operation member 77 (177) can be operated by the electric autofocusing mechanism. Accordingly, similar to the examples of FIGS. 1 through 3, a manual focusing operation and the electric autofocusing mechanism can be performed in an associated manner.

According to the above description, the focusing apparatus of a telescopic lens system can associate a manual focusing operation with an autofocusing mechanism without utilizing complicated mechanism and optical system nor causing an increase of production costs.

What is claimed is:

1. A focusing apparatus of a telescopic lens system comprising a first lens group and a second lens group in this order from an object;

wherein said focusing apparatus comprises two focusing mechanisms which are operable independently from each other and to move said first lens group and said second lens group independently and respectively in the optical axis direction, and which are adapted to vary both absolute and relative positions of said lens groups; and wherein the focusing apparatus satisfies the following condition:

$$0.4 < |T_I/T_{II}| < 2.5$$

wherein $T_I$ designates the traveling distance of said first lens group required for focusing from an infinite distance to a finite photographing distance, and $T_{II}$ designates the traveling distance of said second lens group required for focusing from an infinite distance to a finite photographing distance.

2. The focusing apparatus of a telescopic lens system according to claim 1, wherein one of said two focusing mechanisms comprises a manual focusing mechanism which moves one of said lens groups in the optical axis direction through a manual operation; and wherein the other of said two focusing mechanisms comprises an electric autofocusing mechanism which is activated by an electric means, and moves the other of said lens groups in the optical axis direction.

3. The focusing apparatus of a telescopic lens system according to claim 2, wherein said manual focusing mechanism is applied to said first lens group, and said electric autofocusing mechanism is applied to said second lens group.

4. The focusing apparatus of a telescopic lens system according to claim 2, wherein said electric autofocusing mechanism is applied to said first lens group, and said manual focusing mechanism is applied to said second lens group.

5. The focusing apparatus of a telescopic lens system according to claim 1, satisfying the following condition:

$$0.15 < D_{I-II}/f < 0.7$$

wherein:
   $D_{I-II}$ designates the distance between said first lens group and said second lens group when an object at an infinite distance is in an in-focus state; and
   f designates the focal length of the entire telescopic lens system.

6. The focusing apparatus of a telescopic lens system according to claim 1, wherein said first lens group comprises a positive lens element and a negative lens element;
   wherein said second lens group comprises a positive lens element and a negative lens element; and
   wherein said focusing apparatus of a telescopic lens system satisfies the following conditions:

$$|SC_I/SC| < 0.8$$
$$20 < v_{Ip} - v_{In}$$

wherein
   $SC_I$ designates the total sum of the reciprocal of the product of the focal length and the Abbe number $(1/(fi*vi))$ of each lens element in said positive first lens group; and
   SC designates the total sum of the reciprocal of the product of the focal lengths and the Abbe number $(1/(fi*vi))$ of each lens elements in entire telescopic lens system,
   $v_{Ip}$ designates the Abbe number of the positive lens element of said positive first lens group; and
   $v_{In}$ designates the Abbe number of the negative lens element of said positive first lens group.

7. A focusing apparatus of a telescopic lens system having a first lens group and a second lens group in this order from an object, the focusing apparatus comprising two focusing mechanisms which are operable independently from each other and to move said first lens group and said second lens group independently and respectively in the optical axis direction, and which are adapted to vary both absolute and relative positions of said first and second lens groups;
   wherein the focusing apparatus satisfies the following condition:

$$0.15 < D_{I-II}/f < 0.7$$

wherein
   $D_{I-II}$ designates the distance between said first lens group and said second lens group when an object at an infinite distance is in an in-focus state; and
   f designates the focal length of the entire telescopic lens system.

8. The focusing apparatus of a telescopic lens system according to claim 7, wherein said first lens group comprises a positive lens element and a negative lens element;
   wherein said second lens group comprises a positive lens element and a negative lens element; and
   wherein said focusing apparatus of a telescopic lens system satisfies the following conditions:

$$|SC_I/SC| < 0.8$$
$$20 < v_{Ip} - v_{In}$$

wherein
   $SC_I$ designates the total sum of the reciprocal of the product of the focal length and the Abbe number $(1/(fi*vi))$ of each lens element in said positive first lens group; and
   SC designates the total sum of the reciprocal of the product of the focal lengths and the Abbe number $(1/(fi*vi))$ of each lens elements in entire telescopic lens system,
   $v_{Ip}$ designates the Abbe number of the positive lens element of said positive first lens group; and
   $v_{In}$ designates the Abbe number of the negative lens element of said positive first lens group.

9. A focusing apparatus of a telescopic lens system comprising:
   a first lens group comprising a positive lens element and a negative lens element; and
   a second lens group in this order from an object;
   wherein the focusing apparatus comprises two focusing mechanisms which are operable independently from each other and to move said first lens group and said second lens group independently and respectively in the optical axis direction, and which are adapted to vary both absolute and relative positions of said first and second lens groups;
   wherein said focusing apparatus of a telescopic lens system satisfies the following conditions:

$$|SC_I/SC| < 0.8$$
$$20 < v_{Ip} - v_{In}$$

wherein:
   $SC_1$ designates the total sum of the reciprocal of the product of the focal length and the Abbe number $(1/(fi*vi))$ of each lens element in said first lens group;
   SC designates the total sum of the reciprocal of the product of the focal lengths and the Abbe number $(1/(fi*vi))$ of each lens elements in entire telescopic lens system
   $v_{Ip}$ designates the Abbe number of the positive lens element of said first lens group; and
   $v_{In}$ designates the Abbe number of the negative lens element of said first lens group.

10. A focusing apparatus of a telescopic lens system having a first lens group and a second lens group in this order from an object, the focusing apparatus comprising two focusing mechanisms which are operable independently from each other, and are adapted to vary both absolute and relative positions of said first lens group and said second lens group;
wherein:
   one of said two focusing mechanisms moves the entire telescopic lens system in the optical axis direction; and
   the other of said two focusing mechanisms moves said first lens group in the optical axis direction.

11. The focusing apparatus of a telescopic lens system according to claim 10, satisfying the following condition:

$$0.2 < |T_A/T_I| < 1.5$$

wherein
   $T_A$ designates the traveling distance of the entire telescopic lens system required for focusing from an infinite distance to a finite photographing distance; and
   $T_I$ designates the traveling distance of said first lens group required for focusing from an infinite distance to a finite photographing distance.

12. The focusing apparatus of a telescopic lens system according to claim 10, satisfying the following condition:

$$0.15 < D_{I-II}/f < 0.7$$

wherein $D_{I-II}$ designates the distance between said first lens group and said second lens group when an object at an infinite distance is in an in-focus state; and f designates the focal length of the entire telescopic lens system.

13. The focusing apparatus of a telescopic lens system according to claim 10, wherein said first lens group comprises a positive lens element and a negative lens element;

wherein said second lens group comprises a positive lens element and a negative lens element; and wherein said focusing apparatus of a telescopic lens system satisfies the following conditions:

$$|SC_I/SC| < 0.8$$

$$20 < v_{Ip} - v_{In}$$

wherein:

$SC_I$ designates the total sum of the reciprocal of the product of the focal length and the Abbe number (1/(fi*vi)) of each lens element in said first lens group;

SC designates the total sum of the reciprocal of the product of the focal lengths and the Abbe number(1/(fi*vi)) of each lens elements in the entire telescopic lens system;

$v_{Ip}$ designates the Abbe number of the positive lens element of said first lens group; and $v_{In}$ designates the Abbe number of the negative lens element of said first lens group.

14. The focusing apparatus of a telescopic lens system according to claim 10, wherein one of said two focusing mechanisms comprises a manual focusing mechanism which moves the entire telescopic lens system or said first lens group in the optical axis direction through a manual operation; and wherein the other of said two focusing mechanisms comprises an electric autofocusing mechanism which is activated by an electric means, and moves said first lens group or the entire telescopic lens system in the optical axis direction.

15. The focusing apparatus of a telescopic lens system according to claim 14, wherein said manual focusing mechanism is applied to the entire telescopic lens system, and said electric autofocusing mechanism is applied to said first lens group.

16. The focusing apparatus of a telescopic lens system according to claim 14, wherein said electric autofocusing mechanism is applied to the entire telescopic lens system, and said manual focusing mechanism is applied to said first lens group.

17. The focusing apparatus of a telescopic lens system according to claim 10, wherein said telescopic lens system comprises a positive first lens group and a positive second lens group, in this order from an object; and wherein said focusing apparatus satisfies the following condition:

$$0.2 < |T_A/T_I| < 0.8$$

wherein $T_A$ designates the traveling distance of the entire telescopic lens system required for focusing from an infinite distance to a finite photographing distance; and $T_I$ designates the traveling distance of said first lens group required for focusing from an infinite distance to a finite photographing distance.

18. A focusing apparatus of a telescopic lens system having a first lens group and a second lens group in this order from an object, the focusing apparatus comprising two focusing mechanisms which are operable independently from each other, and are adapted to vary both absolute and relative positions of said first lens group and said second lens group;

wherein one of said two focusing mechanisms moves the entire telescopic lens system in the optical axis direction; and the other of said two focusing mechanisms moves said second lens group fo in the optical axis direction.

19. The focusing apparatus of a telescopic lens system according to claim 18, satisfying the following condition:

$$0.2 < |T_A/T_{II}| < 1.5$$

wherein $T_A$ designates the traveling distance of the entire telescopic lens system required for focusing from an infinite distance to a finite photographing distance; and $T_{II}$ designates the traveling distance of the second lens group required for focusing from an infinite distance to a finite photographing distance.

20. The focusing apparatus of a telescopic lens system according to claim 18, satisfying the following condition:

$$0.15 < D_{I-II}/f < 0.7$$

wherein $D_{I-II}$ designates the distance between said first lens group and said second lens group when an object at an infinite distance is in an in-focus state; and f designates the focal length of the entire telescopic lens system.

21. The focusing apparatus of a telescopic lens system according to claim 18, wherein said first lens group comprises a positive lens element and a negative lens element;

wherein said second lens group comprises a positive lens element and a negative lens element; and wherein said focusing apparatus of a telescopic lens system satisfies the following conditions:

$$|SC_I/SC| < 0.8$$

$$20 < v_{Ip} - v_{In}$$

wherein:

$SC_I$ designates the total sum s of the reciprocal of the product of the focal length and the Abbe number (1/(fi*vi)) of each lens element in said first lens group;

SC designates the total sum of the reciprocal of the product of the focal lengths and the Abbe number(1/(fi*vi)) of each lens elements in the entire telescopic lens system;

$v_{Ip}$ designates the Abbe number of the positive lens element of said first lens group; and $v_{In}$ designates the Abbe number of the negative lens element of said first lens group.

22. The focusing apparatus of a telescopic lens system according to claim 18, wherein one of said two focusing mechanisms comprises a manual focusing mechanism which moves the entire telescopic lens system or said second lens group in the optical axis direction through a manual operation; and wherein the other of said two focusing mechanisms comprises an electric autofocusing mechanism which is activated by an electric means, and moves said second lens group or the entire telescopic lens system in the optical axis direction.

23. The focusing apparatus of a telescopic lens system according to claim 22, wherein said manual focusing mechanism is applied to the entire telescopic lens system, and said electric autofocusing mechanism is applied to said second lens group.

24. The focusing apparatus of a telescopic lens system according to claim 18, wherein said telescopic lens system comprises a positive first lens group and a positive second lens group, in this order from an object; and wherein said focusing apparatus satisfies the following condition:

$$0.2 < |T_A/T_{II}| < 0.8$$

wherein $T_A$ designates the traveling distance of the entire telescopic lens system required for focusing from an infinite distance to a finite photographing distance; and $T_{II}$ designates the traveling distance of said second lens group required for focusing from an infinite distance to a finite photographing distance.

25. A focusing apparatus of a telescopic lens system having a positive first lens group, a negative second lens group, and a positive third lens group, in this order from an object, the focusing apparatus comprising two focusing mechanisms which are operable independently from each other, and which are adapted to vary both absolute and relative positions of at least two of said first, second and third lens groups;

wherein one of said two focusing mechanisms moves said positive first lens group in the optical axis direction; and the other of said two focusing mechanisms moves said positive third lens group in the optical axis direction.

26. A focusing apparatus of a telescopic lens system having a positive first lens group, a negative second lens group, and a positive third lens group, in this order from an object, the focusing apparatus comprising two focusing mechanisms which are operable independently from each other, and which are adapted to vary both absolute and relative positions of at least two of said first, second and third lens groups;

wherein one of said two focusing mechanisms moves said positive first lens group in the optical axis direction; and the other of said two focusing mechanisms moves said negative second lens group in the optical axis direction.

* * * * *